United States Patent
Chen et al.

(10) Patent No.: US 8,233,760 B2
(45) Date of Patent: Jul. 31, 2012

(54) ULTRA LOW PMD FIBERS AND METHOD OF MAKING

(75) Inventors: Xin Chen, Corning, NY (US); Timothy Leonard Hunt, Wilmington, NC (US); Joohyun Koh, Painted Post, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 478 days.

(21) Appl. No.: 12/565,153

(22) Filed: Sep. 23, 2009

(65) Prior Publication Data
US 2010/0086271 A1    Apr. 8, 2010

Related U.S. Application Data

(60) Provisional application No. 61/195,444, filed on Oct. 7, 2008.

(51) Int. Cl.
*G02B 6/032*    (2006.01)
*C03B 37/023*    (2006.01)

(52) U.S. Cl. ......................................... 385/125; 65/435

(58) Field of Classification Search ........................ 65/435
See application file for complete search history.

(56) References Cited

U.S. PATENT DOCUMENTS

| | | | |
|---|---|---|---|
| 6,876,804 B2 | 4/2005 | Chen et al. | 385/123 |
| 2004/0084611 A1 | 5/2004 | Chen et al. | 250/225 |
| 2004/0184751 A1 | 9/2004 | Chen et al. | 385/123 |
| 2005/0163434 A1 | 7/2005 | Kwon et al. | 385/88 |
| 2006/0133751 A1 | 6/2006 | Chen et al. | 385/123 |
| 2007/0230885 A1* | 10/2007 | Guan et al. | 385/125 |
| 2008/0022725 A1 | 1/2008 | Sarchi et al. | 65/435 |

OTHER PUBLICATIONS

Galtarossa et al Article entitled "Calculation of the mean differential group delay of periodically spun, randomly birefringent fibers"; Optics Letters; vol. 27; No. 9; May 1, 2002; p. 692-694.

* cited by examiner

*Primary Examiner* — Jerry Rahll
(74) *Attorney, Agent, or Firm* — Svetlana Z. Short

(57) ABSTRACT

A method for making low PMD fiber comprising the steps of: (i) making an initial fiber preform; (ii) modifying said initial fiber preform to introduce higher birefringence than that of the initial fiber preform into modified preform; and (iii) drawing an optical fiber from the modified preform and bi-directionally spinning the drawn fiber during draw.

18 Claims, 4 Drawing Sheets

ULTRA LOW PMD FIBERS AND METHOD OF MAKING

This application claims the benefit of, and priority to U.S. Provisional Patent Application 61/195,444 filed on Oct. 7, 2008 entitled, "Ultra-Low PMD Fibers and Method of Making", the content of which is relied upon and incorporated herein by reference in its entirety.

BACKGROUND

1. Field of the Invention

The present invention relates generally to optical fiber for telecommunications and more specifically to an optical fiber with low polarization mode dispersion (PMD), and to methods for producing such fiber.

2. Technical Background

Light traveling in an optical fiber has two polarization modes. For optical fibers that are perfectly circularly symmetric in both geometry and internal and applied stress, operation at a wavelength or in a wavelength range which is regarded as "single-moded" actually supports two orthogonal polarization modes, wherein the two polarization modes propagate with the same group velocity and have no time delay after traveling the same distance in the fiber. However, in practice, optical fibers are not perfectly circularly symmetric. For example, imperfections such as geometric and form deformation and stress asymmetry break the degeneracy of the two modes. As a result, the two polarization modes propagate with slightly different propagation constants. The difference between the propagation constants is called birefringence. Polarization mode dispersion (PMD) occurs in an optical fiber as a result of small birefringence induced by deviations of the fiber's core from a perfectly cylindrical shape, asymmetric stresses or strains, and random external forces acting upon the fiber. PMD is well known to severely impair transmission of optical signals at relatively high bit rates.

Various attempts to reduce PMD have been made and involve imparting a spin rotation into the fiber during manufacturing. One method of reducing PMD involves spinning the preform during the fiber drawing process. Another method of combating PMD is to deliberately spin the fiber as it is drawn from the preform, so that a mechanical spin becomes "frozen" into the fiber as it cools. The resulting rotation of the birefringence axis in the fiber produces continual mode-coupling between the orthogonal polarization modes of a carried signal, thereby inhibiting the accumulation of a significant phase lag between the two modes, and consequently causing a significant reduction in the fiber's PMD.

As used herein, spin refers to the rotation introduced into the molten optical fiber, whereas twist refers to the rotational twist which is imparted to the cooled optical fiber. As discussed above, spin imparted into the molten fiber is permanently fixed when the fiber is cooled.

SUMMARY OF THE INVENTION

One aspect of the invention is a method for making low PMD fiber comprising the steps of:
(i.) making an initial fiber preform;
(ii.) modifying said initial fiber preform, to introduce higher birefringence than that of the initial fiber preform, into the modified preform; and
(iii.) drawing an optical fiber from the modified preform while bi-directionally spinning the drawn fiber.

According to one embodiment, a method for making low PMD fiber comprises the steps of:
(i) making a consolidated fiber preform by: (a) making a core cane; (b) overcladding said core cane with cladding to form a preform; and (c) consolidating the preform;
(ii.) wherein the step of making a consolidated fiber preform includes modification of said core cane, cladding, or preform to introduce additional birefringence; and
(iii.) drawing an optical fiber from the preform and bi-directionally spinning the drawn fiber during fiber drawing.

Preferably, the step of modification of the core, cladding, or preform to introduce additional birefringence includes at least one of the following: non-uniformly heating the fiber preform; introducing at least one air hole into the fiber preform, or modifying the core portion of the preform, for example by removing at least one portion of the core cane.

According to one embodiment, the optical fiber comprises a core and a cladding surrounding the core. The cladding includes at least one air hole and the fiber is a spun fiber with a spin period of 0.8 m to 100 m.

It is noted that optical fibers made according to some embodiments of the present invention offer one or more of the following advantages: Low PMD (for example, less than 0.05 ps/km); low birefringence; long beatlength (equal to or greater than 10 meters, e.g., 50 m to 100 m), high uniformity of the linear birefringence (for example, standard deviation $\sigma$ of beat length being less than 5 m, preferably less than 1 m, more preferably less than 0.5 m, and even more preferably less than or equal to 0.25 m; low variation in PMD values (for example, less than 0.03 ps/km$^{1/2}$, more preferably less than 0.01 ps/km$^{1/2}$, and even more preferably less than 0.005 ps/km$^{1/2}$).

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
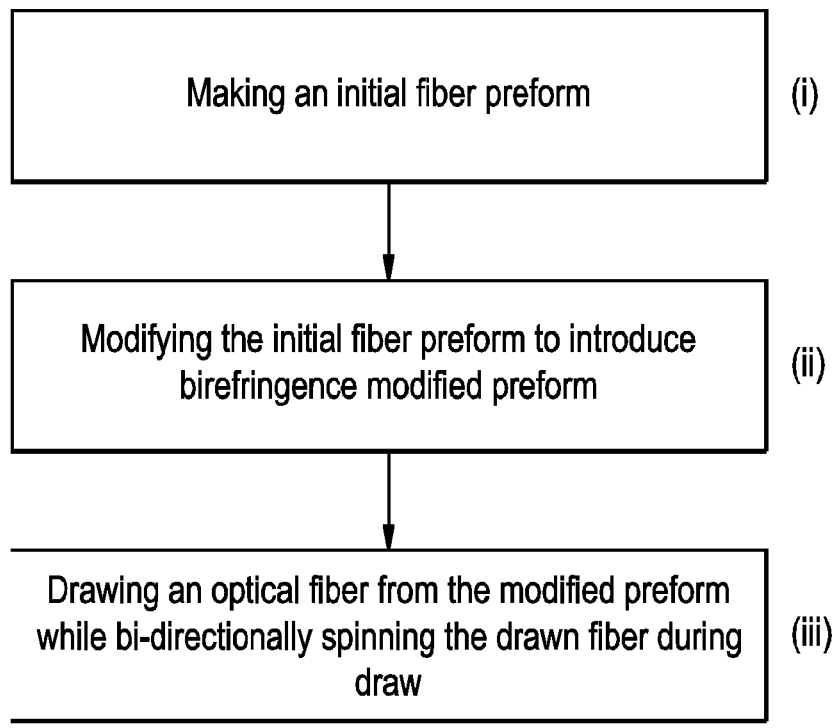
FIG. 1 illustrates schematically a method for making a low PMD fiber according to some embodiments of the present invention.

Reference will now be made in detail to the present preferred embodiment(s) of the invention, examples of which are illustrated in the accompanying drawings. Whenever possible, the same reference numerals will be used throughout the drawings to refer to the same or like parts. One embodiment of the method for making a low PMD fiber of the present invention is shown in FIG. 1. This method for making low PMD fiber 100 comprises the steps of: (i) making an initial fiber preform 10; (ii.) modifying the initial fiber preform to introduce higher birefringence than that of the initial fiber preform into modified preform; and (iii) drawing an optical fiber 100 from the modified preform while bi-directionally spinning the drawn fiber during drawing process.

As embodied herein, a fiber preform is any precursor to an optical fiber, including a core cane, or core cane overclad with silica based glass.

According to one exemplary embodiment of the present invention disclosed herein, a method for making low PMD fiber 100 comprises the steps of: (i) making a consolidated fiber preform 10 by: (a) making a core cane 12; (b) over cladding the core cane 12 with cladding 14 (e.g., by using silica based soot); and (c) consolidating the preform to form a consolidated preform 16; (ii) wherein the step of making a consolidated fiber preform includes a step intentionally modifying of the core portion of the preform, or another portion of the preform to introduce additional birefringence; and (iii) drawing an optical fiber from the preform while bi-directionally spinning the drawn fiber during fiber drawing. It is noted that the introduction of additional birefringence into the fiber increases fiber's PMD. The fiber PMD is typically characterized by the fiber beatlength and the randomness of the birefringence, which gauge the uniformity of the linear birefringence in optical fibers.

Typically, in order to produce a PMD fiber, the unspun fiber is designed to have as little PMD as possible, and the fiber's PMD is then further reduced with fiber spinning. According to some embodiments of the present invention, the modified fiber preform for a typical transmission fiber is produced to result in a fiber (in the unspun form) with beat length $L_{B1}$ of 1 m to 20 m, for example 5 m to 15 m. Applicant's method of producing low PMD fiber is counter-intuitive, because the PMD of the unspun fiber is deliberately increased rather than reduced, which surprisingly results in lower PMD for the spun fiber 100 (when compared to the spun fiber that would have resulted from the fiber preform if the fiber preform was not modified to introduce additional birefringence). Also surprisingly, this method results in optical fibers 100 that have the advantage of having very low PMD value variation (i.e., very uniform PMD values). For example, the exemplary optical fibers 100 have PMD value variation is less than 0.03 ps/km$^{1/2}$, more preferably less than 0.01 ps/km$^{1/2}$, and even more preferably less than 0.005 ps/km$^{1/2}$.

For example, consider a case, where the low PMD fiber, without spinning already has a low PMD, which is normalized to value 1. Assuming that, when spun, fiber PMD will be reduced by a factor of 2, the fiber ends with PMD of 0.5. If the fiber preform is modified to introduce somewhat higher birefringence so as to yield an unspun fiber with twice the PMD value (i.e., PMD=2), when spun during draw the resulting fiber's PMD may improve, for example, by a factor of 10. That is, the spun fiber will end up with a relative PMD of 0.2, instead of PMD of 0.5. Thus, surprisingly, modifying the fiber parameter(s), or modifying the fiber preform, to raise the fiber PMD prior to spinning, results in lower fiber PMD than the spun optical fiber would have had if the PMD (i.e., from additional fiber birefringence) of the unspun fiber had not been raised.

The additional birefringence may be introduced, for example, by uneven heating of the fiber preform, which results in oval core geometry (preferably by uneven heating during preform redraw step), or by removing the edges of the core cane 12 (for example, by machining them off), or by introducing at least one air hole into the fiber preform (thus resulting in a fiber with at least one air hole along the length of the fiber). In the exemplary embodiments, when the fiber is produced unspun from the modified preform 16, the unspun fiber preferably has the beat length $L_{B1}$ (at a wavelength of 1550 nm) of 1 m to 20 m (typically 2 m to 15 m), and low variation in beat length—i.e., the standard deviation of the fiber beatlength is preferably less than 5 m, more preferably less than 2 m, more preferably less than 1 m, even more preferably less than 0.5 m, for example less than or equal to 0.25 m.

Figure 2:
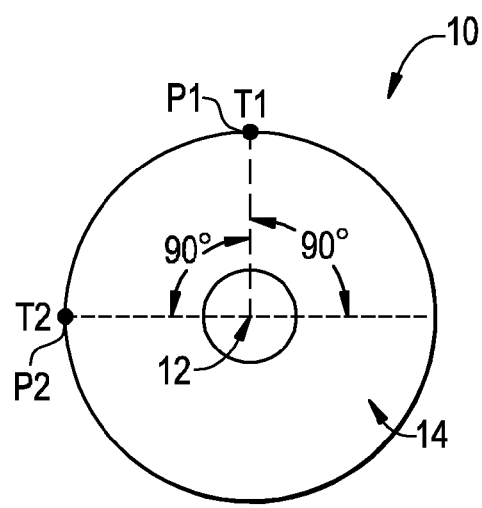
FIG. 2 is illustrates one embodiment of making a fiber preform with a specified birefringence.

For example, the uneven heating of the fiber preform 10 produces a temperature difference $\Delta T=|T_2-T_1|$ on the surface of the preform 10, as illustrated in FIG. 2. More specifically, FIG. 2 illustrates schematically a cross-sectional view of preform 10, with two points P1 and P2 on the preform's surface. In this exemplary embodiment the two points have angular separation of separated by 90°. Preferably, the temperature difference for the points P1 and P2 (is greater than 200° C., more preferably 200° C. to 500° C. The uneven heating of the preform can be achieved by several different methods, for example, un-symmetrical placement of the preform in the furnace, uneven insulation of the furnace, or by applying additional heat from a separate heat source to only one side of the fiber preform. The uneven heating results in a small asymmetry in the fiber preform and introduces additional birefringence, and thus increases PMD of the resulting unspun fiber. The required temperature difference would depend on the amount of birefringence that needs to be introduced into the specific fiber, and can be determined, for example experimentally, by determining the relationship between $\Delta T$ and the resultant beatlength $L_{B1}$, or PMD of the unspun fiber.

The modified preform is drawn into fiber 100 while spinning is engaged. Preferably, the optical fiber 100 has spin amplitude between 1 and 20 turns/m (more preferably 1 and 15 turns/m, for example 1-10 or 1 to 5 turns/m) and spin period between 0.5 m and 100 m, preferably between 0.5 m or 0.8 m and 50 m, (e.g., between 0.5 m and 30 m, or between 1.0 m and 30 m, or 1 m to 50 m). Preferably fiber's spin is bidirectional, and more preferably it is a sinusoidal spin cycle so that the spin profile $\alpha(z)$, which is the spin rate as a function of the position z takes the form of, $$\alpha(z)=\alpha_0 \cos(\eta z). \qquad (1)$$

where $\alpha_0$ is the spin amplitude, $\eta$ is the angular frequency, which is related to the spin period $\Lambda$ by $\eta=2\pi/\Lambda$. Preferably the average spin rate S, is less than 0.2 turns/m, where the average spin rate S is defined by the following equation $$S = \int_0^L \alpha(z')dz' /L, \qquad (2)$$

where and $\alpha(z')$ is spin rate at position z' and L is fiber length.

More, preferably, the average spin rate S of the fibers 100 is less than 0.15 turns/m, more preferably less than 0.1 turns/m, and even more preferably less than 0.02 turns/m. Preferably, the spin rate of the fibers 100 is essentially symmetrical around 0 turns/m, so that there is no significant accumulated rotation in either direction.

To determine the birefringence of the spun fiber 100 we define the effective beatlength $L_{B2}$. Note that for spun fibers, without considering the effect of random mode coupling, the PMD is based on the differential group delay (in unit length) and is determined by the following equation, $$PMD = |J_0(2\alpha_0/\eta)| \cdot (\lambda/cL_{B1}) \qquad (3)$$

where $J_0$ is the zero order Bessel function, $L_{B1}$ is the unspun fiber's beatlength, and $|J_0(2\alpha_0/\eta)|$ is the PMD reduction factor, which describes the reduction of PMD due to the fiber spinning. The effective beatlength $L_{B2}$ of the spun fiber 100 is defined as $$L_{B2} = |J_0(2\alpha_0/\eta)| \cdot \frac{\lambda}{cL_{B1}} \qquad (4)$$

The effective beatlength can be measured by measuring differential group delay DGD, $$DGD = \frac{\lambda l}{cL_{B2}} \qquad (5)$$

When random mode coupling is considered, which happens when the fiber is long (for example longer than 500 m), the following equation is used to determine DGD, $$DGD = \frac{\lambda}{cL_{B2}} \sqrt{hl}$$

where h is the mode coupling length of the fiber.

In the exemplary embodiments described herein, the effective beat length $L_{B2}$ (at a wavelength of 1550 nm) of the embodiments of the optical fiber 100 produced from the modified preform fiber, when the fiber is drawn while spinning, is greater than $L_{B1}$, and preferably greater than 10 m (for example $L_{B2}>20$ m, $L_{B2}>40$ m, or $L_{B2}>100$ m). According to some embodiments the preferable effective beat length $L_{B2}$ (at a wavelength of 1550 nm) of the spun optical fiber 100, when the fiber is drawn while spinning, is less than 2000 m, for example 1000 m or less. For example, for very low PMD fibers 100 that are designed for use in optical transmission systems the beat length is about 11 m to 2000 m, for example 11 m to 40 m, and even more preferably about 15 m to 30 m; but the beat length can be about 50 m to 100 m for fibers 100 that designed for use in sensing applications that require highly uniform low PMD fiber. According to preferred embodiments of fibers 100 have low variation in PMD values, for example, less than 0.01 ps/km$^{1/2}$, or less than 0.005 ps/km$^{1/2}$.

EXAMPLES

The invention will be further clarified by the following examples.

Example 1

Figure 3:
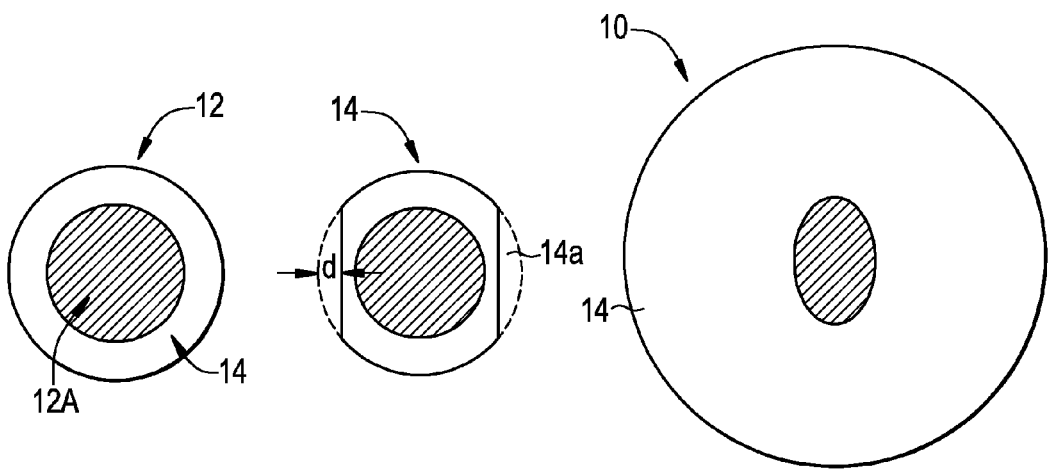
FIG. 3 is illustrates another embodiment of making a fiber preform with a specified birefringence.
Figure 4:
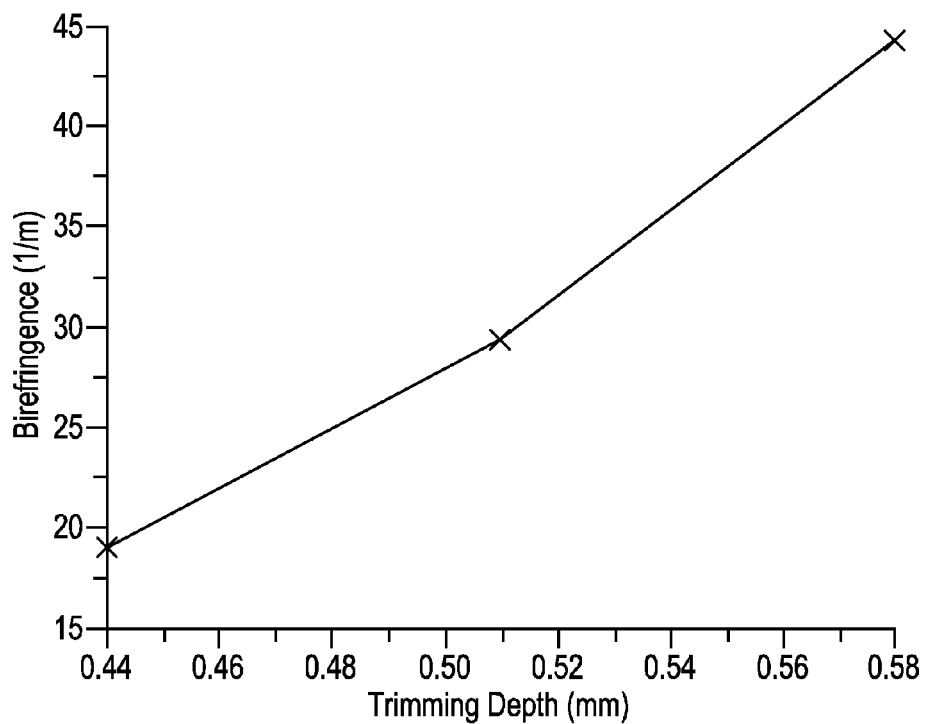
FIG. 4 is a graph of birefringence as a function of the core cane trimming depth for exemplary fibers.

In this example, we machined out an edge of the core cane to introduce a controlled amount of birefringence in the fiber preform level. An illustration of such method is shown in FIG. 3. More specifically, a core cane 12 is machined to remove a small amount (width d) of material from the two opposing sides of the cane 12. Note that core cane 12 includes the core 12A and a thin layer of the cladding 14 (FIG. 3, left side). After the machining step (FIG. 3, center) the modified fiber core cane 12 is provided with a silica based soot overcladding, consolidated to form additional cladding 14, and optionally the whole fiber preform is redrawn (FIG. 3, right side). Because of the tension at the surface of the core cane, in the fiber draw process when the preform is in a molten state, the core 12 will be distorted to introduce a significant amount of birefringence in the resulting unspun fiber. For example, according to some embodiments, the ratio of the fiber core length a to the core width b is: $1<(a/b)\leq 1.02$ and preferably $1\leq(a/b)\leq 1.01$. The amount of the trimming (i.e., the width d of the cutoff section(s) 14a) is correlated with the achieved birefringence or beatlength in the resulting unspun fiber. For example, in one embodiment we have machined out the edge from both sides of the core cane 12 by three different amounts of trim (depths d being 0.44 mm, 0.51 mm and 0.58 mm) The core portion of the core cane 12 of this embodiment has a relative refractive delta of 1% (relative to pure silica). The core cane has diameter $D_1$ of 14.4 mm with the core diameter $D_0$ of 2.0 mm. The trimmed core cane 14' is further overcladded with pure silica soot, having weight of 5700 g. Three different unspun fibers (each corresponding to a different amount of trim) were drawn from the preform 10, and the beatlength of these fibers was measured at 1550 nm In FIG. 4, we show the fiber birefringence (defined as $B_1=2\pi/L_{B1}$, where $L_{B1}$ is the beat length of unspun fiber) as a function of the trimming depth d. The three fiber examples correspond to the trim depth d of about 0.44 mm, 0.51 mm and 0.58 mm, respectively. FIG. 4 illustrates that the relationship between birefringence $B_1$ of the unspun fiber and the trim depth d is approximately linear. Using the graph of FIG. 4, or a similar graph for different fibers, we can conveniently predict the birefringence, and thus the average beatlength $L_{B1}$ of (unspun) fiber given a certain trim depth d, by conducting interpolation or extrapolation. More specifically, the above trim values d corresponded to beat length $L_{B1}$ of 0.35 m, 0.22 m, and 0.14 m. Using FIG. 4, and extrapolating the data, indicated that trim value d of about 0.41 mm would result in beat length $L_{B1}$ of 2 m. Based on other experiments, when the fiber is spun during the drawing process, the resulting fiber would have PMD of less than 0.05 ps/km$^{1/2}$ if the trim depth d was 0.41 mm The spin characteristics of these three exemplary fibers of Example 1 were as follows: spin amplitude of about 3 turns/m, spin period 1.2 m, average spin rate S less than 0.1 turns/m. The fibers' effective spin was bidirectional, and more specifically sinusoidal. After the fiber is spun, the fiber beat length becomes larger ($L_{B2}>L_{B1}$), i.e., the beat length changes from the range of 1 m to 20 m (e.g., $L_{B1}=2$ m to 8 m) to the range of 10 m to 100 m (for example $L_{B2}$ is 30 m to 60 m), and the fiber 100 exhibits low PMD values of $\leq 0.05$ ps/m$^{1/2}$. For example, the values for the effective beat length of fiber 100, may be: $L_B' \geq 1.5 L_B$. Preferably $L_B' \geq 2 L_B$, or $L_B' \geq 3 L_B$.

Thus, exemplary optical fibers 100 designed or made according to at least some of the embodiments of the present invention advantageously have a low value of PMD$\leq 0.05$ ps/m$^{1/2}$, more preferably PMD$\leq 0.03$ ps/km$^{1/2}$, and/or beat length uniformity over the length of the fiber characterized by standard deviation σ, where $|\sigma| \leq 5$ m, and preferably less than 2 m, even more preferably no more than 1 m, and even more preferably no more than 0.5 m (for example 0.25 m or less).

Example 2

Figure 5A:
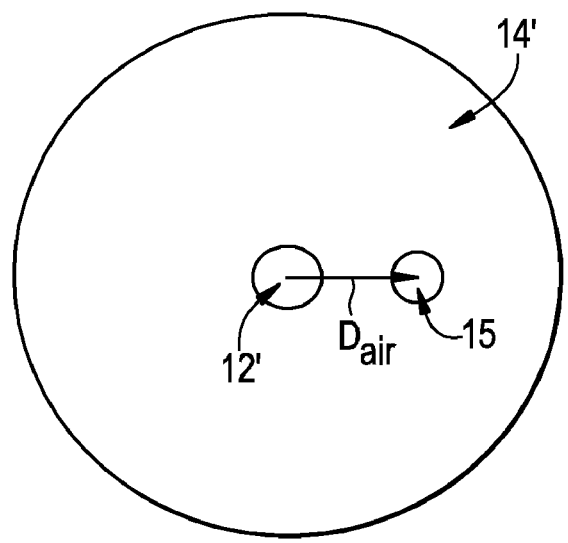
FIGS. 5a and 5b illustrate exemplary fibers that have slight birefringence produced by at least one air hole positioned a specified distance away from the fiber core.
Figure 5B:
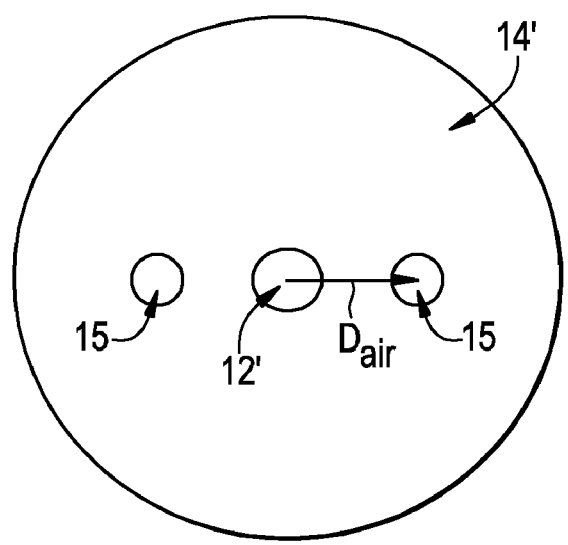
Figure 6:
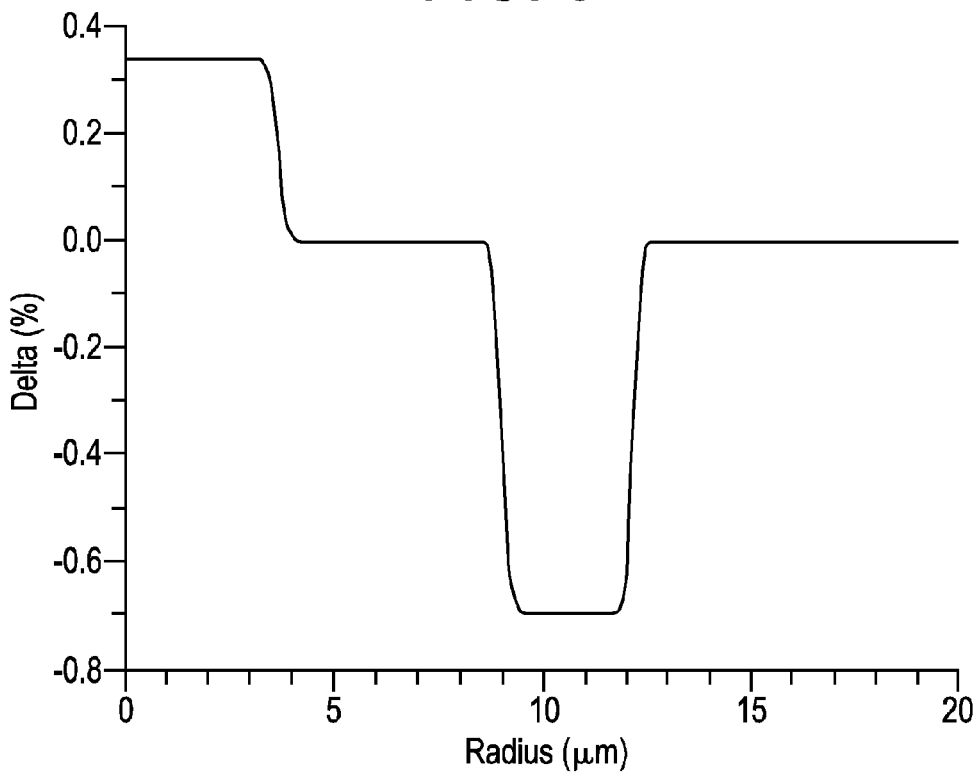
FIG. 6 illustrates refractive index delta profile for the fiber shown in FIG. 5b.
Figure 7:
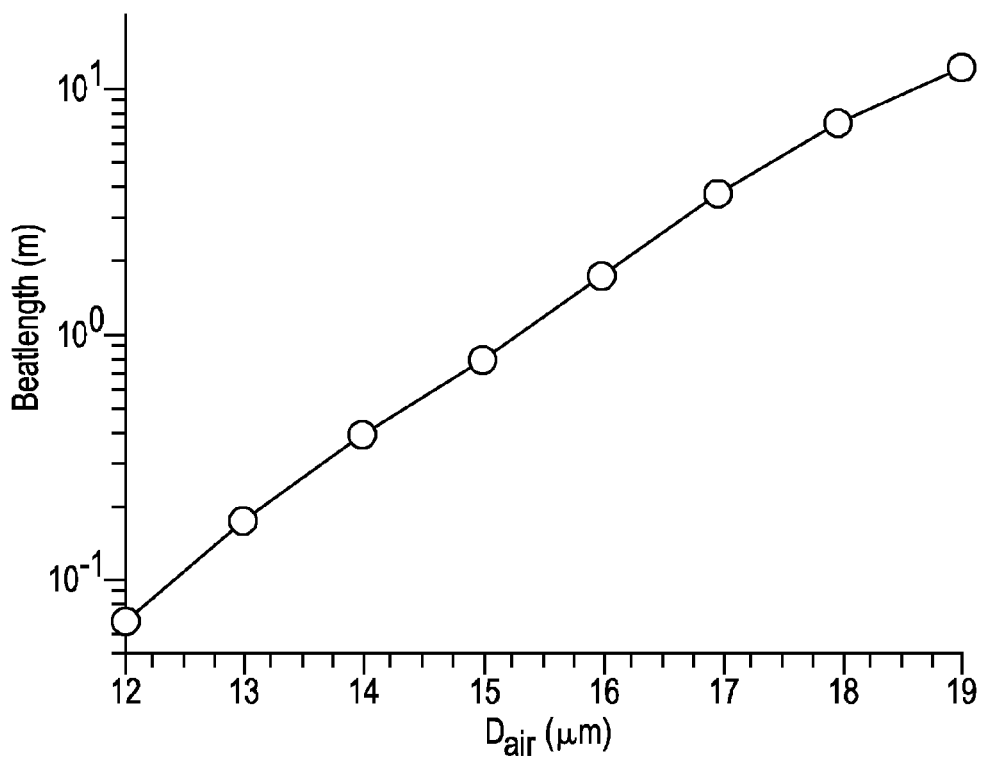
FIG. 7 is a graph of beatlength as a function of $D_{air}$ for a fiber with dual air holes shown in FIG. 5b.

Birefringence can also be introduced, for example, by placement of air hole(s) in the cladding layer of the fiber preform. Two examples of resulting fiber embodiments are illustrated in FIGS. 5a and 5b. More specifically, FIGS. 5a and 5b illustrate optical fiber cross-sections that include at least one air hole 15. Preferably, the air hole(s) diameter is between 8 μm and 25 μm, and distance $D_{air}$ between the center of the fiber core 12' to the center of the air hole 15 is from 10 μm to 30 μm, preferably 12 μm to 20 μm. The air hole(s) 15 contributes to asymmetry in fiber cross-section, and thus adds birefringence. The fiber of FIG. 5a includes one air hole. The fiber of FIG. 5b includes two air holes that are situated within cladding 14', near two opposing sides of the fiber core. The exemplary fiber 100 of FIG. 5b has a refractive index delta profile which is illustrated in FIG. 6, with zero Δ value corresponding to pure silica. The fiber 100 has core delta $\Delta_{core}$ of 0.34%, and the core radius $R_{core}$ is 4.2 μm. The air hole radius $R_{airhole}$ for this fiber is 6 μm. FIG. 6 illustrates how, for an exemplary fiber of FIG. 5b, the fiber beatlength $L_B$ (measured at 1550 nm) scales with the distance $D_{air}$ (where $D_{air}$ is the distance between the fiber core center and the air hole center). A similar graph can be drawn for a fiber of FIG. 5a. FIG. 6 illustrates that when the axis for the beatlength is scaled exponentially, the relation between the beatlength $L_{B1}$ and the distance $D_{air}$ is quasi-linear. This makes it convenient to predict the distance $D_{air}$ necessary to produce a fiber of a specified beatlength. For example, by properly selecting the distance between the center of the fiber 12' and the center of the air hole 15, we can design fibers, for example, with unspun fiber beatlengths $L_{B1}$ between 1.5 m and 20 m (e.g., between 2 m and 15 m). For example, in order for unspun fiber to have a target beatlength $L_{B1}$ of 3 m at 1550 nm, the distance $D_{air}$ should be around 17.2 μm. When the unspun fiber is drawn from the fiber preform, the fiber should preferably have (i) average beat length at 1550 nm of less than 20 m, more preferably between 1 m and 15 m, even more preferably 2 m to 8 m, and (ii) standard deviation (of beatlength) of less than 5 m (for fibers with $L_{B1}$>7 m), more preferably less than 1 m, preferably less than 0.25 m. After the fiber is spun during the draw process, the optical fiber 100 will have longer average beat length $L_{B2}$ at 1550 nm (i.e., $L_{B2}$>$L_{B1}$), with $L_{B2}$ being preferably between 10 m and 2000 m, for example 12 m to 100 m, and more preferably between 20 m and 100 m (for example: 15 m to 50 m, 20 m to 40 m, 20 m to 50 m, 30 m to 60 m, or 50 m to 100 m) and PMD values below 0.1 ps/km$^{1/2}$, for example below 0.05 ps/km$^{1/2}$.

Thus, exemplary optical fibers 100 made according to at least some of the embodiments of the present invention will advantageously have a low value of PMD≦0.2 ps/km, more preferably ≦0.2 ps/km, and/or beat length uniformity over the length of the fiber characterized by standard deviation σ, where |σ|≦5 m, and preferably less than 2 m, even more preferably no more than 1 m, and even more preferably no more than 0.5 m.

It is noted that optical fibers made according to one some embodiments of the present invention offer one or more of the following advantages: Low PMD (for example, less than 0.2 ps/km); low birefringence; long beatlength (greater than 10 meters, e.g., 50 m to 100 m), high uniformity of the linear birefringence (for example, standard deviation σ of beat length being less than 1 m, preferably less than 0.5 m, and more preferably less than 0.25 m; low variation in PMD values (for example, less than 0.01 ps/km$^{1/2}$, more preferably less than 0.005 ps/ps/km$^{1/2}$).

Example 3

We have prepared a preform with elevated fiber birefringence and PMD by trimming a portion of the core cane. Subsequently we drew both spun fiber and unspun fiber from the preform. We further measured the differential group delay of the unspun fiber with the length of 5.95 m, and found that the differential group delay is 0.021 ps at the wavelength of 1550 nm. Following the equation that differential group delay $$\tau = \frac{\lambda l}{cL_b},$$

where λ is the wavelength, l is the length of the fiber, c is the speed of light in vacuum, and $L_b$ is the fiber beatlength, we determined that the beatlength of the fiber is 1.5 m. For both unspun and spun fibers we also wind 500 m of fiber on a measurement spool with about 30 cm radius, with zero tension. The 500 m of unspun fiber has a DGD of 0.33 ps while the spun fiber has the DGD of 0.018 ps. Scaled to 1 km length, the unspun fiber thus has a calculated PMD of 0.47 ps/sqrt (km) while the spun fiber 100 has a calculated PMD of 0.025 ps/sqrt(km). The fiber PMD improved by factor of 18.3.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for making low PMD fiber comprising the steps of:
   (i.) making an initial fiber preform;
   (ii.) modifying said initial fiber preform to introduce higher birefringence than that of the initial fiber preform into modified preform; and
   (iii.) drawing an optical fiber from the modified preform and bi-directionally spinning the drawn fiber during draw.

2. The method of claim 1, wherein said step of modifying said initial preform to introduce said birefringence includes one of: removing at least a portion of said initial fiber preform, non-uniformly heating said initial fiber preform, or introducing at least one air hole into said initial fiber preform.

3. The method for making low PMD fiber according to claim 1, wherein the average spin rate $$S = \int_0^L \alpha(z')\,dz'/L$$

is less than 0.1 turns/m, where α(z') is spin rate at position z' and L is fiber length.

4. The method for making low PMD fiber according to claim 3, wherein the average spin rate is less than 0.1 turns/m.

5. The method for making low PMD fiber according to claim 3, wherein the average spin rate is less than 0.02 turns/m.

6. The method for making low PMD fiber according to claim 1, wherein
   (i.) said fiber preform, if drawn into a fiber without spinning produces the drawn fiber with have average beat length at 1550 nm between 1 m and 20 m, and standard deviation of beat length is less than 1 m, along the length of fiber; and (ii.) said modified fiber preform, if drown into a fiber while bi-directionally spinning the fiber to provide amplitude 0.5 to 30 turns/m and spin period 0.8 m to 100 m with the spin rate that is essentially symmetrical around 0 turns/m produces the low PMD fiber with PMD$\leq$0.05 ps/km$^{1/2}$, beat length between over 10 m, and beat length uniformity over the length of the fiber characterized by standard deviation $\sigma$, where $|\sigma|\leq 2$ m.

7. The method for making low PMD fiber according to claim 1, wherein (i.) said fiber preform, if drawn into a fiber w/o spinning produces the drawn fiber with have average beat length at 1550 nm between 1 m and 15 m, and standard deviation of beat length is less than 1 m, along the length of fiber; and (ii.) said modified fiber preform, if drown into a fiber while bi-directionally spinning the fiber to provide amplitude 0.5 turns/m to 30 turns/m and spin period 0.8 m to 100 m with the spin rate that is essentially symmetrical around 0 turns/m produces the low PMD fiber with PMD$\leq$0.1 ps/km$^{1/2}$, beat length between 30 m to 60 m, and beat length uniformity over the length of the fiber characterized by standard deviation $\sigma$, where $|\sigma|\leq 2$ m.

8. The method for making low PMD fiber according to claim 6 or 7, wherein $|\sigma|\leq 0.5$ m.

9. A method for making low PMD fiber according to claim 1 wherein the steps of making the initial fiber preform and the modified preform include:

(i) making a consolidated fiber preform by: (a) making a core cane; (b) over cladding said core cane with cladding to form a preform; and (c) consolidating said preform;

(ii.) wherein the step of making a consolidated modified fiber preform includes a step intentionally modifying said core cane, cladding, or preform to introduce additional birefringence; and (iii.) drawing an optical fiber from the modified preform and bi-directionally spinning the drawn fiber during fiber drawing.

10. The method for making low PMD fiber according to claim 9, wherein said step of modifying preform to introduce birefringence includes at least one of the following: (a) non-uniformly heating said fiber preform; (b) introducing at least one air hole into said fiber preform; and (c) removing at least a portion of the core cane.

11. The method for making low PMD fiber according to claim 9, wherein said spinning:

(i) has amplitude 0.5 to 30 turns/m;
(ii) spin period 0.8 m to 100 m; and
(iii) is essentially symmetrical spin rate around 0 turns/m.

12. The method for making low PMD fiber according to claim 1, wherein said spinning:

(i) has amplitude 0.5 to 30 turns/m;
(ii) spin period 0.8 m to 100 m; and
(iii) is essentially symmetrical spin rate around 0 turns/m.

13. The method of making low PMD according to claim 12, further including bidirectionally spinning the fiber made from said preform during draw process to provide amplitude of 1 to 15 turns/m and spin period 1 m to 50 m.

14. The method of making low PMD fiber comprising the steps of:

(i.) making an initial fiber preform, such that if that preform was drawn into a fiber without spinning, the drawn fiber would have average beat length at 1550 nm between 1 m and 20 m and standard deviation of beat length is less than 1 m, along the length of fiber; said step of making the initial fiber preform includes a sub-step of introducing birefringence;

(ii.) bidirectionally spinning the fiber made from said preform during draw process, to provide amplitude 0.5 to 30 turns/m and spin period 0.8 m to 100 m spin rate is essentially symmetrical around 0 turns/m.

15. An optical fiber comprising: (i) a core; and (ii) a cladding surrounding said core, said cladding including at least one air hole; wherein said fiber is a spun fiber with a spin period of 0.8 m to 100 m.

16. The optical fiber according to claim 15, wherein said spin period is 1 m to 50 m, and said fiber has a spin rate essentially symmetrical about 0 turns/m.

17. The optical fiber according to claim 16, wherein said fiber has a bidirectional spin.

18. The optical fiber according to claim 15, wherein said wherein said fiber has a bidirectional spin.

* * * * *